United States Patent [19]

Hensel et al.

[11] Patent Number: 4,919,104

[45] Date of Patent: Apr. 24, 1990

[54] RECIPROCATING MACHINE

[76] Inventors: Hartmut Hensel, Duvehof 1, 3000 Hannover 1, Fed. Rep. of Germany; Oliver Laing, 3970 Honeycutt St., San Diego, Calif. 92109; Karsten Laing, Hofenerweg 37, 7148 Remseck-2, Fed. Rep. of Germany

[21] Appl. No.: 814,992

[22] Filed: Dec. 30, 1985

[30] Foreign Application Priority Data

Dec. 27, 1984 [DE] Fed. Rep. of Germany ....... 3447459

[51] Int. Cl.$^5$ ............................................. F02M 23/00
[52] U.S. Cl. .................................. 123/533; 123/45 R; 92/173
[58] Field of Search ..................... 123/45 R, 45 A, 26, 123/531, 533; 60/520; 92/173, 222

[56] References Cited

U.S. PATENT DOCUMENTS

| 1,904,126 | 4/1933 | Donaldson | 92/173 |
| 4,330,993 | 5/1982 | Beale | 92/173 X |
| 4,357,915 | 11/1982 | Monsour | 123/45 R |
| 4,413,473 | 11/1983 | Moscrip | 60/517 |

Primary Examiner—Stephen F. Husar
Attorney, Agent, or Firm—Henri J. A. Charmasson

[57] ABSTRACT

The invention relates to reciprocating machines with pistons being lubricated by a gas film which is built-up by rotation of the piston in the cylinder, both piston and cylinder consisting preferably of ceramic materials. The invention relates furthermore to engines comprising rotating pistons.

10 Claims, 3 Drawing Sheets

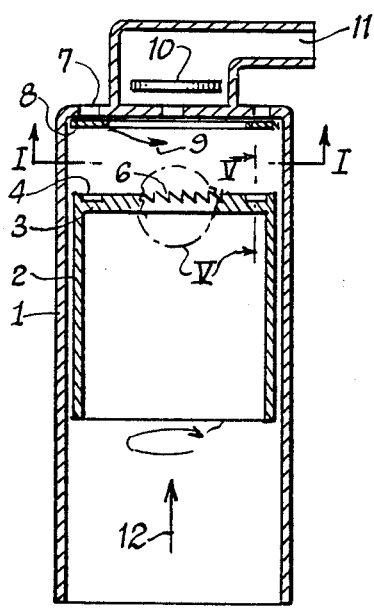
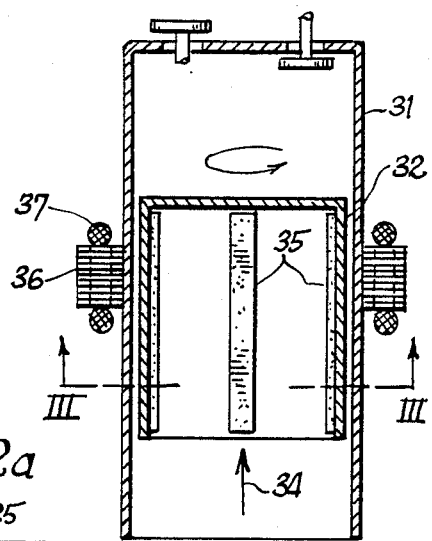
FIG. 1a
FIG. 3a
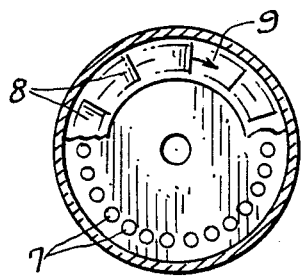
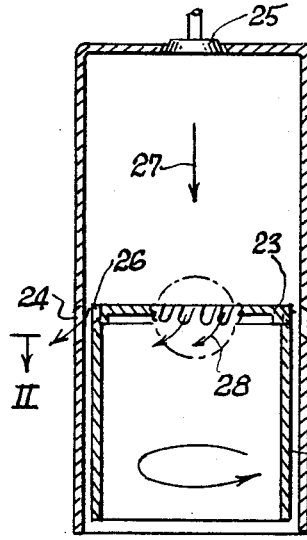
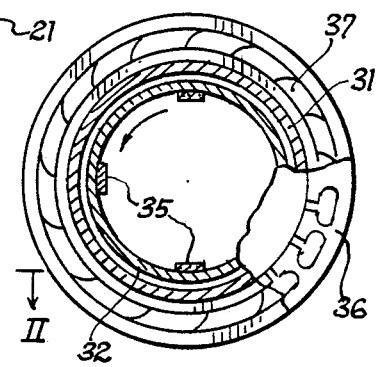
FIG. 1b
FIG. 2a
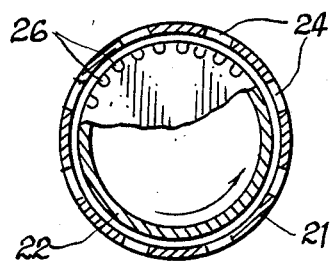
FIG. 3b
FIG. 2b

RECIPROCATING MACHINE

BACKGROUND OF THE INVENTION

Oil-free operation of air compressors has the advantage that the compressed air, e.g. in air handtools used in the immediate vicinity of individuals, is free of oil. Such compressors in which the piston is not in contact with the wall of the cylinder are known. However oil-lubricated piston rods maintain the working clearance between these pistons and cylinders. The disadvantage of such compressors consists in that a considerable portion of the compressed gas leaks through the clearance between piston and cylinder. Oil-free compressors are also of importance in refrigerating systems. Due to the mixing enthalpy of two phases of refrigerant mixtures enormous thermodynamic losses occur, therefore oil-free centrifugal compressors are preferred in large systems. All small units, comprising reciprocating compressors require a mixture of a refrigerant (e.g. freon) and a lubricant, therefore efficiency being considerably lower. A further disadvantage of these units consists in that an oil film precipitates on the walls of the heat transmitting tubes, causing increase of temperature drop and consequently reducing Carnot efficiency.

Oil-free operation is of special importance also to combustion engines since engines having walls without cooling (known as adiabatic engines) have a higher thermodynamic effiency.

Although piston engines with gas-lubricated pistons are known they are not used to date, since the fluid dynamic forces of the reciprocating piston in its dead center positions become zero.

It has also been proposed to use pistons and cylinders made of ceramic materials, but also this development has not been put into practice yet.

SUMMARY OF THE INVENTION

The invention relates to gas-lubricated reciprocating machines with pistons. According to the invention the piston is being rotated by fluid-dynamic or magnetic forces, while the axial forces of the piston are being transmitted via a bearing between the piston and the throw of the crank shaft. Therefore the invention requires devices serving the transmission of axial forces onto the crank shaft. The invention makes preferably use of ceramic materials. The invention relates to compressors and motors, specially to refrigerating compressors and to adiabatic diesel engines.

BRIEF DESCRIPTION OF THE DRAWING

The invention is being described with the aid of the following figures:

FIG. 1a diagrammatically illustrates a piston-cylinder unit in a first rotating position under the impact of the entering gas stream;

FIG. 1b is a top view of a cross-section taken along line I—I of FIG. 1a;

FIG. 2a diagrammatically illustrates a two-stroke engine cylinder;

FIG. 2b is a top view of a cross-section taken along line II—II of FIG. 2a;

FIG. 3a diagrammatically illustrates a magnetically-driven piston;

FIG. 3b is a top view of a cross-section taken along line III—III of FIG. 3a;

FIG. 4b is a partial cross-sectional view of the crankshaft design taken along line V—V of FIG. 4a;

In FIGS. 1a and 1b the piston 2 rotates in a cylinder 1 whose means for the transmission of the axial forces are being omitted for better understanding. The bottom 3 of the piston comprises a groove 4. In the circle 5 section V—V through the groove 4 is shown, wherein the unilaterally inclined teeth 6 can be seen. Through apertures 7 the gas enters during the suction stroke and is being conveyed by the spring segments 8 in direction of the arrows 9, thus performing an intensive squirrel which rotates the piston 2. The impact takes thus place only during the suction stroke. During the compression stroke the spring segments 8 close the apertures 7. The compressed gas enters the pressure pipe 11 via the outlet valve 10. FIG. 1b shows the plane of projection according to I—I.

FIGS. 2a and 2b show a cylinder 21 of a two stroke engine with a piston 22, the cylinder having an inlet valve 25 and outlet slots 24 controlled by the movement of the piston. Before the bottom 23 of the piston 22 reaches the level of the outlet slots 24, a connection between the inner space of the cylinder 21 and the ambient air is made by the channels 26, so that a small portion of the exhaust gas leaves through the channels 26 and is deflected according to the arrow 28, impacting the piston 22 with a thrust shortly before the end of each stroke. FIG. 2b shows a section according to the line II—II.

FIG. 3a shows a cylinder 31 whose piston 32 comprises permanent magnets 35, which are driven by the rotary magnetic field of the pole ring 36. This pole ring 36 is similar to the stator of a 3-phase electric motor and is equipped with coils 37. The piston 32 acts as a synchronous armature. FIG. 3b shows section according to the line III—III.

FIG. 4a shows symbolized a 2-stroke dual stage diesel engine. The piston 62 in the high pressure cylinder 61 is connected with the piston 64 of a secondary expansion stage via rod 63. The secondary piston 64 reciprocates in the cylinder 65 and transmits the forces of expansion via crank 66 and crankthrow 67 to the crankshaft 68. The piston 64 is equipped with two L-shaped rods 69 which are connected by the plate 70 and the rod 71 to the piston 72 of a dual-stage air compressor 72, 73, 74, 75. With each group of diesel cylinders 61 and secondary cylinders 65 two dual-stage compressors 73 and 73' are associated. The diesel piston 62 contains channels 62a and is driven by the same principle as shown in FIG. 2. In the position shown the channels 62a overlap the outlet slots 62'. In these channels 62a exhaust gas accelerates and provides a rotary impact which enables piston 62 to rotate. Piston 62 and cylinder 61 are both made of ceramic material, preferably of silicon carbide or silicon nitride. The thrust rod 63 transmits the axial forces of the piston 62 to the bearing plate 76 which is rotatably suspended by bearing balls 78 in the secondary piston 64. The piston 64 together with the bearing of the crank 66 and the bearings of the crankshaft 68 are lubricated with oil. During compression stroke all pistons 62, 64, 72, 72', 74 and 74' are moved in the direction of the arrow 62''. During this stroke piston 72 sucks ambient air through valve 79 and simultaneously compresses the air previously entered through inlet valve 80. The compressed air is discharged through pipe 81 to the heat exchanger 82. Cooling air provided by a fan is conveyed according to arrows 83 and extracts the compression heat from the heat exchanger 82. The compressed air, now cooled down will be conveyed via pipe 84 into cylinder 75. Piston 74 compresses the precompressed air up to the final pressure and conveys the air, compressed by two stages through pipe 87 into heat exchanger 88 and after compression heat is extracted it will be conveyed into the compression tank 89.

Figure 4A:
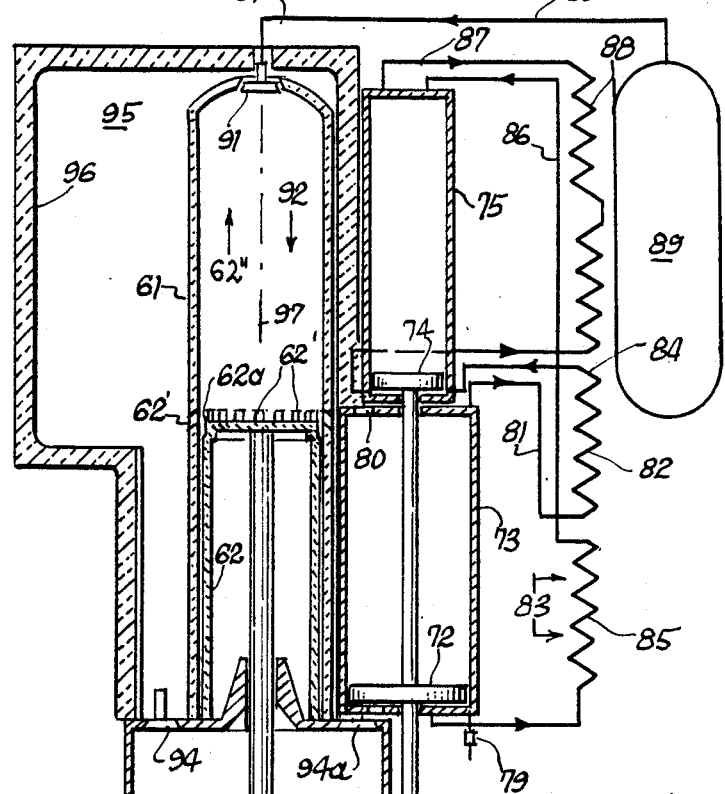
FIG. 4a is a vertical cross-sectional view of a two-stroke dual stage engine.

Through inlet-valve 91 the compressed cold air enters the diesel cylinder 61. The temperature of this air surpasses ignition temperature of the fuel injected at the end of the compression stroke. Combustion of this fuel produces increase of pressure resulting in movement of piston 62 in direction of arrow 92. The secondary piston 64 expels during the compression stroke in the direction of arrow 62" the exhaust gas through exhaust valve 94a. As soon as the upper dead-center point is reached, valve 94 opens so that the exhaust gas of the diesel cylinder 61, still under pressure, flows into cylinder 65. During expansion the temperature and pressure of this exhaust gas drops till all usable energy is extracted. Diesel cylinder 61 is surrounded by the storage space 95 so that the heat, transmitted through the wall of cylinder 61 remains to be useful for the secondary expansion in the secondary cylinder 65. The storage space 95 is insulated by an insulation layer 96 to avoid heat losses.

Caused by the rotation of the diesel piston 62 the piston has in all positions of one reciprocating cycle sufficient gas lubrication preventing contact between the piston 62 and the wall of cylinder 61.

Figure 4B:
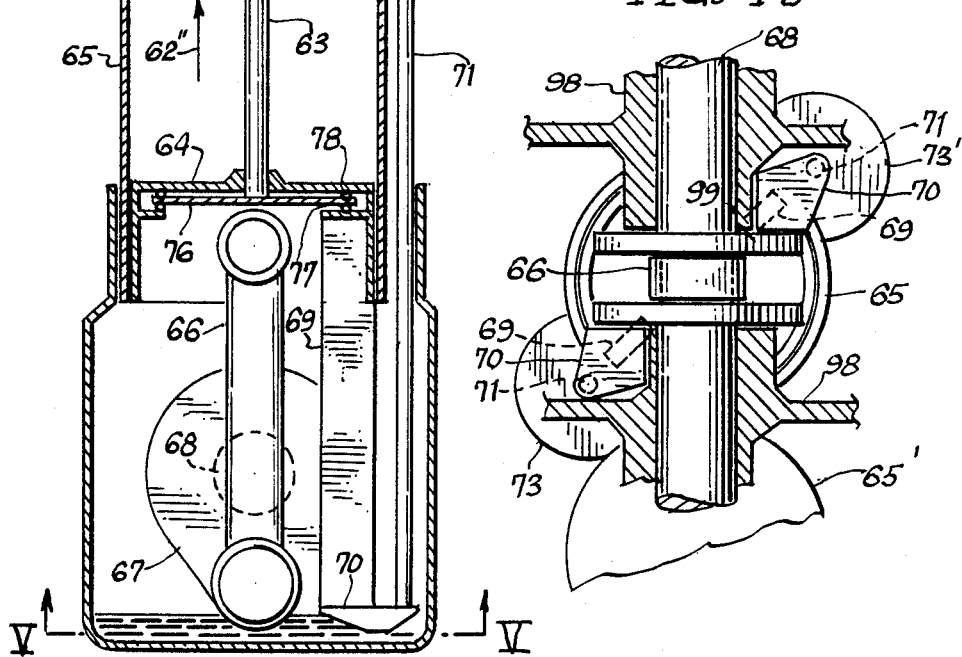

FIG. 4b shows the crank shaft design according to section V-V in FIG. 5a seen in the direction of the arrow 60. The bushing 98 of the crankshaft 68 is shown partly in a section view. The connecting plate 70 transmits the forces of the pistons 62 and 64 to the pistons 72 and 74 of the dual stage compressor. The oil of the oil sump lubricates piston 64, the crank bearings 66, the bearing plate 76 and the pistons 72 and 74.

The motor described may consist of more than one set of cylinders 61 and 65 whereby the juxtaposed cylinders 65 and 65' are positioned close to each other.

Figure 5:
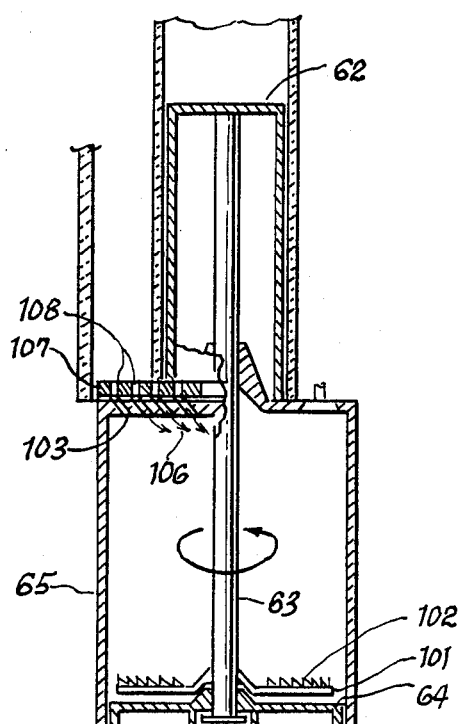
FIG. 5 is a vertical cross-sectional view of an alternate design of the secondary stage.

FIG. 5 shows an alternative design of the secondary stage. The rotation of the diesel piston 62 is caused by applying the principle shown in FIG. 1. The hot gas enters the cylinder 65 through a rotary disc valve consisting of the stationary part 103 forming part of the top of the cylinder 65 and the ring 107 with holes 108. The entering gases form a squirrel 106. The rod 63 is equipped with a plate 101, connected to the piston 64 by the bearing 76. Said plate 101 having a ring portion with unilaterally inclined teeth 102 acting as turbine blades and causing rotation of the piston 62. The ring 107 pivots synchroneously with the crank shaft 68.

Figure 6:
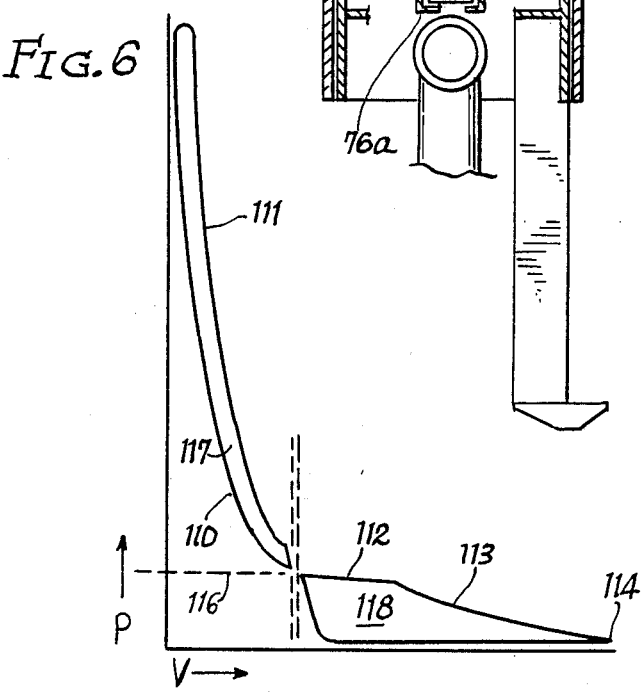
FIG. 6 is a pressure/volume diagram of the diesel engine and of the secondary stage.

FIG. 6 shows the pressure-volume diagram of the diesel engine described above. The branch 110 of the upper curve indicates development of pressure and volume during compression stroke while branch 111 indicates the increased values during combustion stroke. The lower curve shows in its branch 112 the phase in which the still pressurized exhaust gases of the diesel cylinder 61 enter the secondary cylinder 65. The branch 113 represents the expansion stroke ending with the lower dead-center point. At 114 exhaust stroke starts. Area 117 represents performance of the primary diesel engine, area 118 represents the performance of the secondary stage.

What is claimed:

1. A piston-type diesel engine which comprises a cylinder, a gas-lubricated piston reciprocating in the cylinder and acting via a thrust rod on kinematic means transforming the reciprocating movement into rotation, drive means for rotating the piston around its axis; and the piston being rotatably connected to the kinematic means; the cylinder and piston being made of a ceramic material; means for feeding the cylinder with compressed air; and means for conveying exhaust gases to a second cylinder of a secondary positive displacement piston-type machine.

2. Piston-type engine according to claim 1 wherein the secondary positive displacement machine (64, 65) is lubricated with oil and connected with a crank shaft (67, 68) by a crank (66) and furthermore that the piston (62) of the diesel engine is connected with the secondary piston (64) by a thrust rod (63) and a bearing (16, 17, 18).

3. Piston-type machine according to claim 1 wherein the secondary piston (64) is connected via rods (69 and 71) with a positive displacement compressor (72, 73 and 74, 75) and that the compression heat is extracted by heat exchangers (82, 85, 88).

4. A piston-type diesel engine having a cylinder and valve means in which gas is compressed or expanded by a reciprocating piston which is connected to the crank-throw of a crankshaft by a crank, means for rotating the piston to form together with the cylinder a gas bearing which prevents contact between said cylinder and said piston, wherein the cylinder and piston are made of ceramic material, means for feeding the cylinder with compressed air, and means for conveying exhaust gases to a second cylinder of a secondary positive displacement piston-type machine.

5. A piston-type reciprocating engine comprising a first cylinder with a geometrical axis;
   a high pressure piston having an active face surrounded by said first cylinder wherein said high pressure piston and first cylinder form a unit having an interior space; a second cylinder, a low pressure piston within said second cylinder, said low pressure piston having a larger diameter than the high pressure piston and being coaxial with said high pressure piston, said low pressure piston further having a thrust bearing;
   a rod connecting the high pressure piston with the thrust bearing;
   said lower pressure piston being connected via a piston rod to a crankshaft, said engine also comprising means for spinning said pressure piston around the axis.

6. A piston type reciprocating engine according to claim 5, wherein the low pressure piston is connected to a positive displacement air compressor via a shaft.

7. A piston type reciprocating engine according to claim 6, wherein the compressed air from said air compressor is conveyed through a heat exchanger.

8. A piston type reciprocating engine acting as a diesel engine according to claim 5, wherein the first cylinder is fed with said compressed air and that exhaust gases from said first cylinder are conveyed to the second cylinder.

9. A piston type reciprocating engine according to claim 5, wherein the first cylinder contains outlet slots being cyclically opened by the high pressure piston whereby a rim portion of said high pressure piston adjacent to the active face of said high pressure piston contains grooves following screw lines in an axial direction and being connected by apertures with said interior space within the first cylinder.

10. A piston type reciprocating engine according to claim 5, wherein the first cylinder and the high pressure piston are composed of a ceramic material.

* * * * *